United States Patent [19]

Hiromoto et al.

[11] Patent Number: 4,993,744
[45] Date of Patent: Feb. 19, 1991

[54] VEHICULAR ANTI-ROLL SYSTEM FOR STABILIZING THE ORIENTATION OF A VEHICLE BODY

[75] Inventors: Shuji Hiromoto; Masatoshi Narioka; Osamu Nakayama, all of Yokohama, Japan

[73] Assignee: NHK Spring Co., Ltd., Yokohama, Japan

[21] Appl. No.: 393,885

[22] Filed: Aug. 14, 1989

[30] Foreign Application Priority Data

Aug. 25, 1988 [JP] Japan ................................. 63-211387
Aug. 25, 1988 [JP] Japan ................................. 63-211388
Aug. 25, 1988 [JP] Japan ................................. 63-211389

[51] Int. Cl.$^5$ .......................... B60G 9/00; B60G 17/00
[52] U.S. Cl. ........................... 280/707; 280/689; 188/299
[58] Field of Search ............... 280/707, 702, 709, 703, 280/714; 188/266, 279, 282, 299; 267/64.12, 64.13, 64.28

[56] References Cited

U.S. PATENT DOCUMENTS

| | | | |
|---|---|---|---|
| 3,778,081 | 12/1973 | Takahashi et al. | 280/112 |
| 4,491,207 | 1/1985 | Boonchanta et al. | 188/299 |
| 4,607,861 | 8/1986 | Elsenberg et al. | 280/702 |
| 4,620,619 | 11/1986 | Emura et al. | 188/319 |
| 4,635,906 | 1/1987 | Bump | 267/64.15 |
| 4,720,085 | 1/1988 | Shinbori et al. | 280/707 |
| 4,746,106 | 5/1988 | Fukumura | 267/216 |
| 4,813,519 | 3/1989 | Matsubara et al. | 188/299 |
| 4,828,231 | 5/1989 | Fukumura et al. | 267/64.23 |

FOREIGN PATENT DOCUMENTS

| | | |
|---|---|---|
| 51-28891 | 8/1976 | Japan . |
| 60-119638 | 8/1985 | Japan . |
| 62-12409 | 1/1987 | Japan . |
| 62-137812 | 8/1987 | Japan . |

*Primary Examiner*—Richard A. Bertsch
*Attorney, Agent, or Firm*—Frishauf, Holtz, Goodman & Woodward

[57] ABSTRACT

A hydropneumatic suspension for a left wheel and a hydropneumatic suspension assembly for a right wheel are connected to each other by means of an anti-roll cylinder. A sub-tank is connected to each suspension assembly. A spring constant switching valve is disposed between each suspension assembly and its corresponding sub-tank. The sub-tanks are charged with a compressed inert gas. When a vehicle turns, the anti-roll cylinder operates so that some of oil is discharged from the inside suspension assembly, while oil is supplied to the outside suspension assembly. While the vehicle is turning, the spring constant switching valve for outside suspension assembly is opened, so that the outside suspension assembly is caused to communicated with its corresponding sub-tank, whereby the spring constant of the outside suspension assembly is lowered. When the turning movement is finished, the spring constant switching valve is closed, so that the suspension assembly is disconnected from the sub-tank.

11 Claims, 6 Drawing Sheets

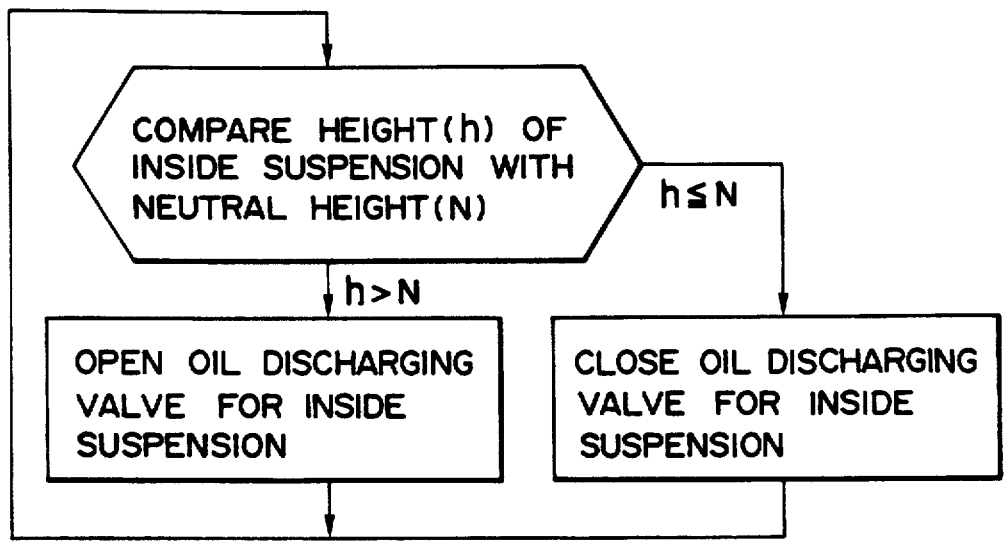
F I G. 6
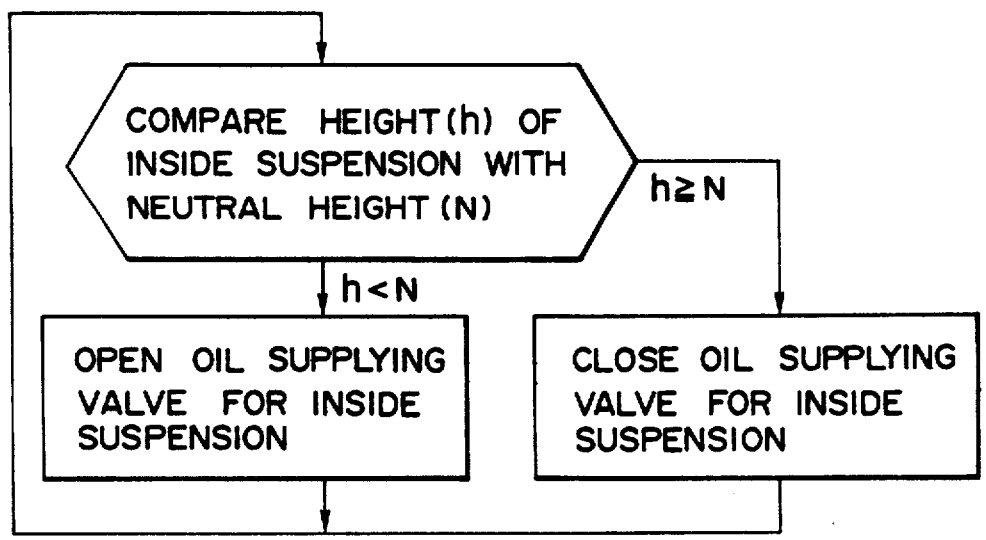
F I G. 7

VEHICULAR ANTI-ROLL SYSTEM FOR STABILIZING THE ORIENTATION OF A VEHICLE BODY

Background of the Invention

1. Field of the Invention

The present invention relates to an anti-roll system for stabilizing the orientation of the body of a vehicle, such as an automobile, while the vehicle is changing its course or running along a curve of a road.

2. Description of the Related Art

As shown in FIG. 8, a pair of hydropneumatic suspension assemblies 101 and 102 each comprise cylinder 103 or 104, rod 105 or 106, oil chamber 107 or 108, and gas chamber 109 or 110 charged with compressed gas. The gas pressure inside gas chambers 109 and 110 acts so as to force out rods 105 and 106 from cylinders 103 and 104, respectively. When a vehicle turns to the left, for example, a centrifugal force acts on vehicle body 111. Accordingly, a load bearing on rod 105 of inside suspension assembly 101 is reduced, while a load bearing on rod 106 of outside suspension assembly 102 increases. The respective absolute values of decrement $-W$ of the load produced on the inside and increment $+W$ of the load produced on the outside are substantially equal.

Thus, in outside suspension assembly 102, the compressed gas in gas chamber 110 is further compressed corresponding to the load increment, so that the length of projection of rod 106 from cylinder 104 is reduced. In inside suspension assembly 101, on the other hand, the length of projection of rod 105 increases for the load decrement. In this state, therefore, the vehicle body tilts considerably in the transverse direction.

As means for restraining such a rolling effect, anti-roll systems are disclosed in U.S. Pat. No. 3,778,081 and Published Unexamined Japanese Utility Model Application No. 62-137812 (issued by the Japan Patent Office). In these prior art systems, oil chambers 107 and 108 are connected to each other by means of oil passage 115, and anti-roll cylinder 116 is provided in the middle of passage 115, as shown in FIG. 8. When the vehicle turns to the left, for example, some of the oil is discharged from inside suspension assembly 107 by anti-roll cylinder 116, and the same amount of oil is supplied to outside oil chamber 108, so that the vehicle body is restrained from rolling. Thus, the capacity of inside gas chamber 109 increases by $+\alpha$, while that of outside gas chamber 110 decreases by $-\alpha$, as compared with the values obtained before turning movement.

A study made by the inventors hereof revealed that the conventional anti-roll systems are subject to the following drawbacks.

Gas chambers 109 and 110 of suspension assemblies 101 and 102 charged with the compressed gas serve as a gas spring. The spring characteristic (relationship between load and deflection) of the gas spring is a nonlinear characteristic such that the greater the deflection on the contraction side, the greater the spring constant will be, as shown in FIG. 9. The respective absolute values of load increment $+W$ on the outside of the turning movement of the vehicle and load decrement $-W$ on the inside are equal. Accordingly, deflection L1 of the outside suspension assembly is not equal to deflection L2 of the inside suspension assembly (L1≠L2).

Since the amount of oil discharged from the inside suspension assembly by anti-roll cylinder 116 during the turning movement is equal to the amount of oil supplied to the outside suspension assembly, the respective absolute values of decrement $-\delta$ of the deflection of the inside suspension assembly and increment $+\delta$ of the deflection of the outside suspension assembly are equal. These suspension assemblies have nonlinear characteristics such that their spring constant increases in proportion to the deflection on the contraction side. These various factors indicate that the heights of the left and right suspension assemblies become actually equal when the height of each suspension assembly is greater by H than the value obtained before the turning movement. More specifically, deflection L1 of the outside suspension assembly in the contracting direction is smaller by H than $\delta$, while deflection L2 of the inside suspension assembly in the expanding direction is greater by H than $\delta$. Accordingly, the position of the center of gravity of the vehicle body during the turning movement is higher by H than the height reached before the turning movement, so that the running stability of the vehicle is poor.

Summary of the Invention

Accordingly, the object of the present invention is to provide an anti-roll system, capable of restraining rolling during a turning movement of a vehicle and of preventing the center of gravity from rising during the turning movement.

An anti-roll system provided by the inventors hereof has advantages such that it ca keep the body of a vehicle substantially horizontal while the vehicle body is turning, can prevent the center of gravity of the vehicle body from rising during the turning movement, and can ensure higher running stability of the vehicle than the conventional anti-roll systems.

The system according to the present invention is an anti-roll system for stabilizing the orientation of the body of a vehicle while the vehicle is turning, which comprises: a pair of hydropneumatic suspension assemblies, each including a cylinder and a rod inserted therein, each of the suspension assemblies having an oil chamber containing oil and a gas chamber charged with compressed gas and having a nonlinear spring characteristic such that the spring constant of the suspension assembly increases as the suspension assembly deflects in the direction moving the rod into the cylinder; an anti-roll cylinder connected to the paired suspension assemblies and adapted to discharge some of the oil from the inside suspension assembly to supply oil to the outside suspension assembly so that the heights of the two suspension assemblies are equal as the vehicle turns; accumulating means connected to each of the suspension assemblies and having a gas chamber defined therein, the gas chamber containing a compressed gas; and spring constant switching means disposed between the suspension assemblies and the accumulating means corresponding thereto, each of the switching means being adapted to operate such that the outside suspension is caused to communicate with the accumulating means, thereby causing the gas chamber of the outside suspension assembly and the gas chamber of the accumulating means to cooperate with each other, as the vehicle turns.

Brief Description of the Drawings

FIG. 6 is a flow chart illustrating the way valves operate when the centrifugal force increases in the system shown in FIG. 5;

FIG. 7 is a flow chart illustrating the way the valves operate when the centrifugal force decreases in the system shown in FIG. 5;

Detailed Description of the Preferred Embodiments

Figure 1:
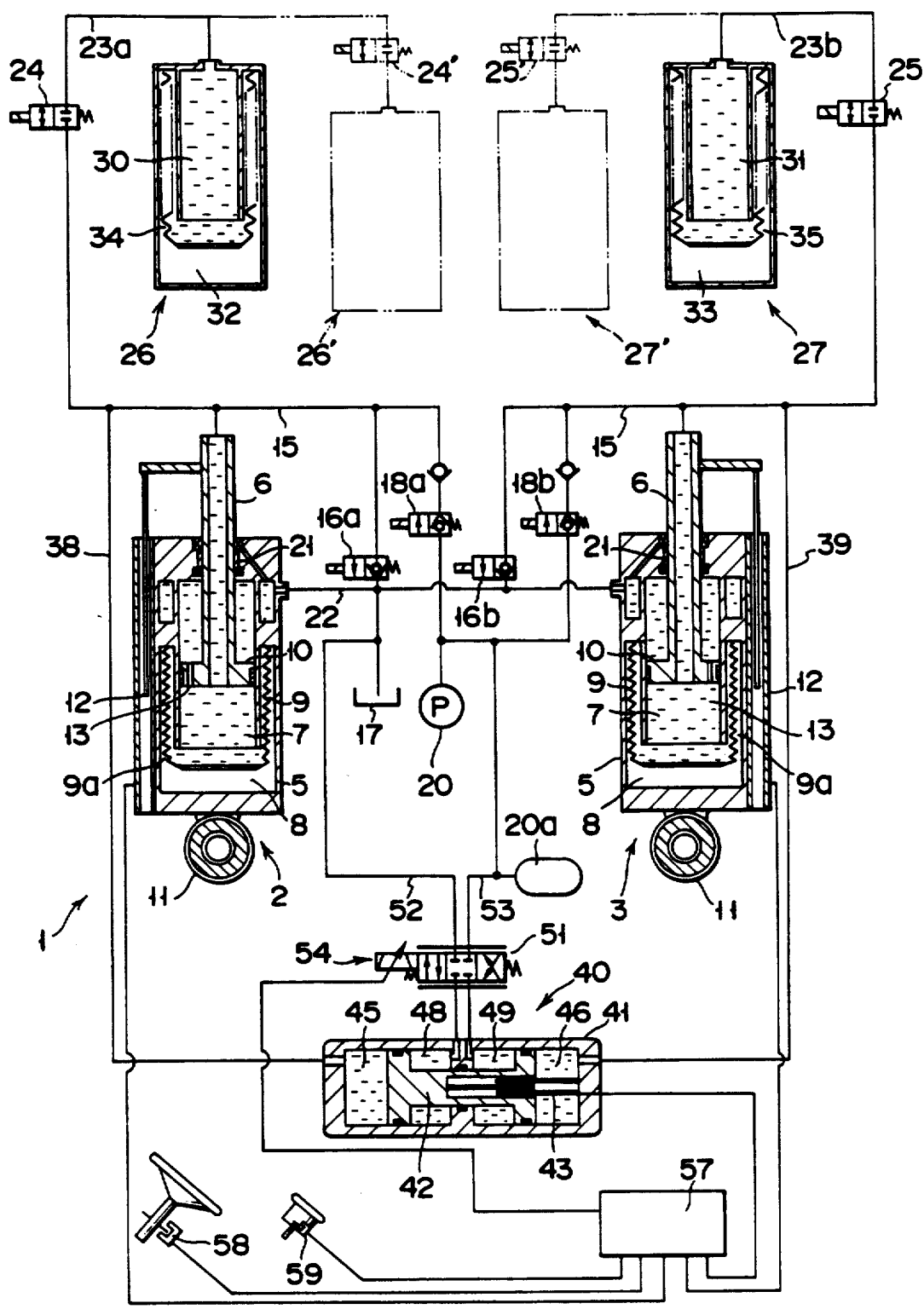
FIG. 1 shows a hydraulic system of an anti-roll system according to a first embodiment of the present invention.

Anti-roll system 1 shown in FIG. 1 comprises hydropneumatic suspension assembly 2 for a left wheel and hydropneumatic suspension assembly 3 for a right wheel. Suspension assemblies 2 and 3 each include cylinder 5 and rod 6 inserted therein for movement in the axial direction thereof. Arranged inside cylinder 5 are oil chamber 7 filled with oil and gas chamber 8 charged with an inert gas, such as nitrogen. The gas charging pressure is adjusted to a high level (e.g., 80 kgf/cm$^2$) such that the tare of the body of a vehicle and movable load can be supported by only the repulsive force of gas. Chambers 7 and 8 are divided by means of partition member 9 which is composed of metallic bellows 9a capable of axial expansion and contraction. The gas pressure inside gas chamber 8 acts on oil chamber 7 through member 9, so that it urges rod 6 to be forced out of cylinder 5.

Piston portion 10 formed at an end of rod 6 inside oil chamber 7. The lower end of cylinder 5 is connected to a wheel-side member by means of connecting portion 11. The upper end of rod 6 is connected to a body-side member. Height sensor 12, composed of a potentiometer, is used to detect the axial position of rod 6 relative to cylinder 5, that is, the height of the suspension assembly. Damping force generating mechanism 13, which is provided at piston portion 10, has an orifice. When cylinder 5 and rod 6 are caused to move relatively to each other in the vertical direction by the roughness of a road surface, for example, gas chamber 8 increases or decreases its capacity, thereby absorbing a shock. As oil flows through mechanism 13, moreover, the motion of rod 6 is damped.

Hydraulic pipe 15 is connected to oil chamber 7. It is connected to oil tank 17 through oil discharging valve 16a (16b) for use as an example of oil discharging means. Pipe 15 is also connected to hydraulic pump 20, as a hydraulic source, and accumulator 20a through oil supplying valve 18a (18b) for use as an example of oil supplying means. Valves 16a (16b) and 18a (18b) are operated by means of a solenoid. Seal portion 21 between cylinder 5 and rod 6 communicates with oil tank 17 by means of drain pipe 22.

Oil chambers 7, 7 of suspension assemblies 2 and 3 are connected, respectively, to sub-tanks 26 and 27 through oil passages 23a and 23b and solenoid valves 24 and 25 for spring constant switching. Sub-tanks 26 and 27, for use as accumulating means, have oil chambers 30 and 31 and gas chambers 32 and 33, respectively, therein. Oil chambers 30 and 31 are completely divided from their corresponding gas chambers 32 and 33 by means of partition members 34 and 35, respectively, each composed of a metallic bellows. Chambers 32 and 33 are charged with a compressed inert gas, such as nitrogen. The gas charging pressure is equal to the gas pressure inside gas chamber 8.

Paired suspension assemblies 2 and 3, constructed in this manner, are connected to anti-roll cylinder 40 by means of oil passages 38 and 39, respectively. Cylinder 40 comprises symmetrical housing 41, piston 42 axially movable inside the housing, and detector 43 for detecting the axial position of the piston. The inside of housing 41 is divided into left and right oil chambers 45 and 46 by means of piston 42. Left chamber 45 communicates with oil chamber 7 of left-wheel suspension assembly 2 by means of oil passage 38. Right chamber 46 communicates with oil chamber 7 of right-wheel suspension assembly 3 by means of oil passage 39. Left and right control oil chambers 48 and 49 are disposed inside piston 42.

Piston 42 is moved in the horizontal direction of FIG. 1 inside cylinder 41 by means of servo mechanism 54, which is composed of servo valve 51, hydraulic pipes 52 and 53, etc. Thus, depending on the position of servo valve 51, oil pressure accumulated in accumulator 20a acts on left or right control oil chamber 48 or 49, so that piston 42 moves in the direction of the oil pressure.

Servo mechanism 54 is controlled by means of controller 57 which is formed of a microcomputer. Controller 57 is connected electrically with steering angle sensor 58 for detecting the operation angle of a steering wheel, and speed sensor 59 for detecting the running speed of the vehicle. Output signals from sensors 58 and 59 are supplied to controller 57. In controller 57, the size of a centrifugal force produced by a turning movement is automatically calculated on the basis of the relationship between the operation angle of the steering wheel and the vehicle speed following a previously programmed procedure. A signal from height sensor 12 is also supplied to controller 57.

The following is description of the operation of anti-roll system 1 with the aforementioned construction.

Figure 3:
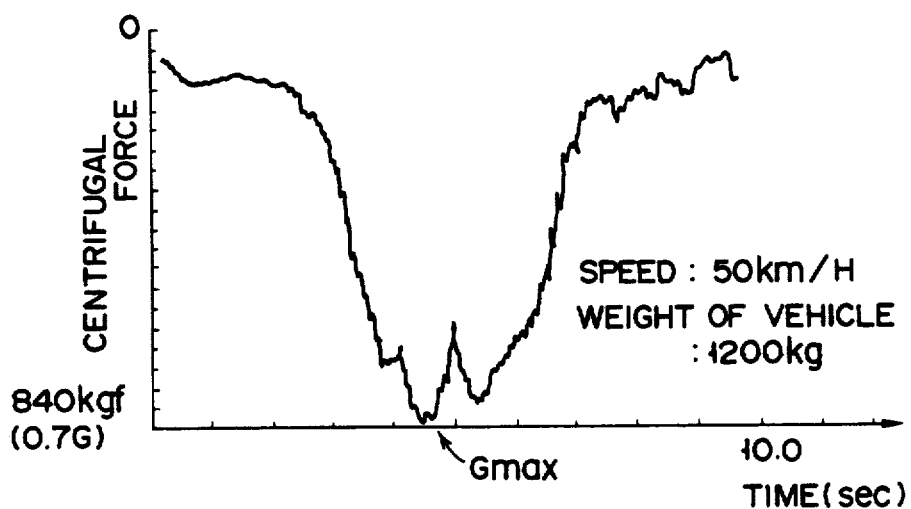
FIG. 3 is a diagram showing change of a centrifugal force during a turning movement of a vehicle.

When the vehicle turns to run along a curve or change its course, the vehicle body is subjected to a transverse centrifugal force. FIG. 3 shows measured data on the centrifugal force produced when the vehicle, running at a speed of 50 km per hour, turns in an arc of a circle with a radius of about 10 m. In this example, peak $G_{MAX}$ of the centrifugal force appears about 5 seconds after the start of the turning movement.

When the vehicle turns to the left, for example, the turning state is detected by sensors 58 and 59, servo valve 51 is driven to the right of FIG. 1 in response to a command from controller 57. Thereupon, the oil pressure of accumulator 20a acts on right control oil chamber 49, so that piston 42 moves toward right oil chamber 46. As a result, the oil in chamber 46 is supplied to oil chamber 7 of outside suspension assembly 3, and at the same time, the same amount of oil from inside suspension assembly 2 flows into left oil chamber 45.

Figure 2:
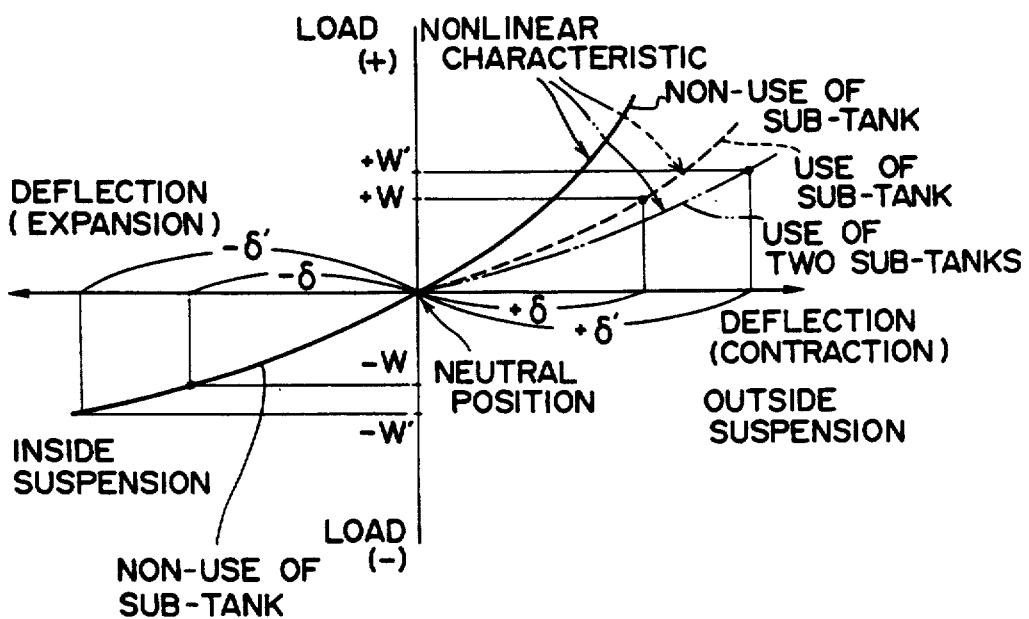
FIG. 2 is a diagram showing the relationship between the load and deflection of a suspension assembly shown in FIG. 1.

As spring constant switching valve 25 between outside suspension assembly 3 and sub-tank 27 opens, moreover, oil chambers 7 and 31 communicate with each other, so that the oil can flow between chambers 7 and 31. Thus, gas chamber 8 of suspension assembly 3 and gas chamber 33 of sub-tank 27 cooperate as gas spring means. As a result, the spring constant of outside suspension assembly 3 lowers, as indicated by a broken-line curve in FIG. 2. Since spring constant switching valve 24 of inside suspension assembly 2 is kept closed, on the other hand, the spring constant of suspension assembly 2 is kept in the state before the turning, that is, the characteristic indicated by a full-line curve in FIG. 2 is maintained for suspension assembly 2. Since there is such a difference between the spring characteristics of the inside and outside suspension assemblies, the outside suspension assembly deflects by $+\delta$ in a contracting direction for load increment $+W$, while the inside suspension assembly deflects by $-\delta$ in an expanding direction for load decrement $-W$. Thus, the deflections of left and right suspension assemblies 2 and 3 have substantially the same absolute value $|\delta|$, so that the heights of suspension assemblies 2 and 3 ar substantially equal, and the center of gravity can be prevented from rising.

When the vehicle turns to the right, on the other hand, piston 42 of anti-roll cylinder 40 is moved to the left of FIG. 1. As a result, the oil is supplied to oil chamber 7 of left-wheel suspension assembly 2, while some of the oil in right-wheel suspension assembly 3 is discharged. As spring constant switching valve 24 of suspension assembly 2 is opened, gas chamber 8 of outside suspension assembly 2 and gas chamber 32 of subtank 26 cooperate with each other. Thus, the spring constant of suspension assembly 2 lowers, so that the heights of suspension assemblies 2 and 3 are substantially equal, and the center of gravity can be prevented from rising, as in the case of the left-handed turning.

In system 1 of the present embodiment, anti-roll cylinder 40 is driven only when the turning extent, that is, the size of the centrifugal force, exceeds a certain limit. More specifically, the size of the centrifugal force during the turning movement is calculated in response to detection values delivered from steering sensor 58 and speed sensor 59 to controller 57, and the calculated value is compared with a previously inputted reference value. If the difference between the calculated value and the reference value is within predetermined limits, piston 42 of anti-roll cylinder 40 is held in a neutral position, and anti-roll control cannot be performed. If the difference between the calculated value and the reference value exceeds the predetermined limits, servo valve 51 is controlled in accordance with the size of the centrifugal force, so that the greater the centrifugal force, the greater is the stroke of piston 42. The stroke of piston 42 is detected by detector 43, and fed back to controller 57.

In system 1 of the present embodiment, if spring constant switching valves 24 and 25 of suspension assemblies 2 and 3 are simultaneously opened while the vehicle is running straight ahead, the spring constant of the suspension assemblies lowers, so that the comfortableness of the vehicle to ride in is improved. Also, the spring constant can be increased by simultaneously closing valves 24 and 25 during the straight running.

Two or more sub-tanks may be connected to each of suspension assemblies 2 and 3. As indicated by two-dot chain line in FIG. 1, for example, second tanks 26' and 27' may be additionally used. In this case, second spring constant switching valves 24' and 25' are additionally disposed between sub-tanks 26' and 27' and first sub-tanks 26 and 27, respectively. Like first valves 24 and 25, second valves 24' and 25' are controlled by means of controller 57. In this case, three spring characteristics can be obtained, as indicated by full line, broken line, and two-dot chain line in FIG. 2.

In this case, when the vehicle turns to the right to a relatively large extent or with a great centrifugal force, for example, the spring characteristic of outside suspension assembly 2 is switched to the one indicated by two-dot chain line in FIG. 2 by opening both spring constant switching valves 24 and 24' of suspension assembly 2. Since spring constant switching valves 25 and 25' of inside suspension assembly 3 is kept closed, suspension assembly 3 enjoys the spring constant indicated by full line in FIG. 2, without regard to the extent of the turning movement. If the extent of the turning movement is small or if the centrifugal force is small, on the other hand, the spring constant of outside suspension assembly 2 is switched to the one indicated by broken line in FIG. 2. Thus, by increasing the sub-tanks and the spring constant switching valves in number, more appropriate anti-roll control can be effected, depending on the centrifugal force during the turning movement.

Figure 4:
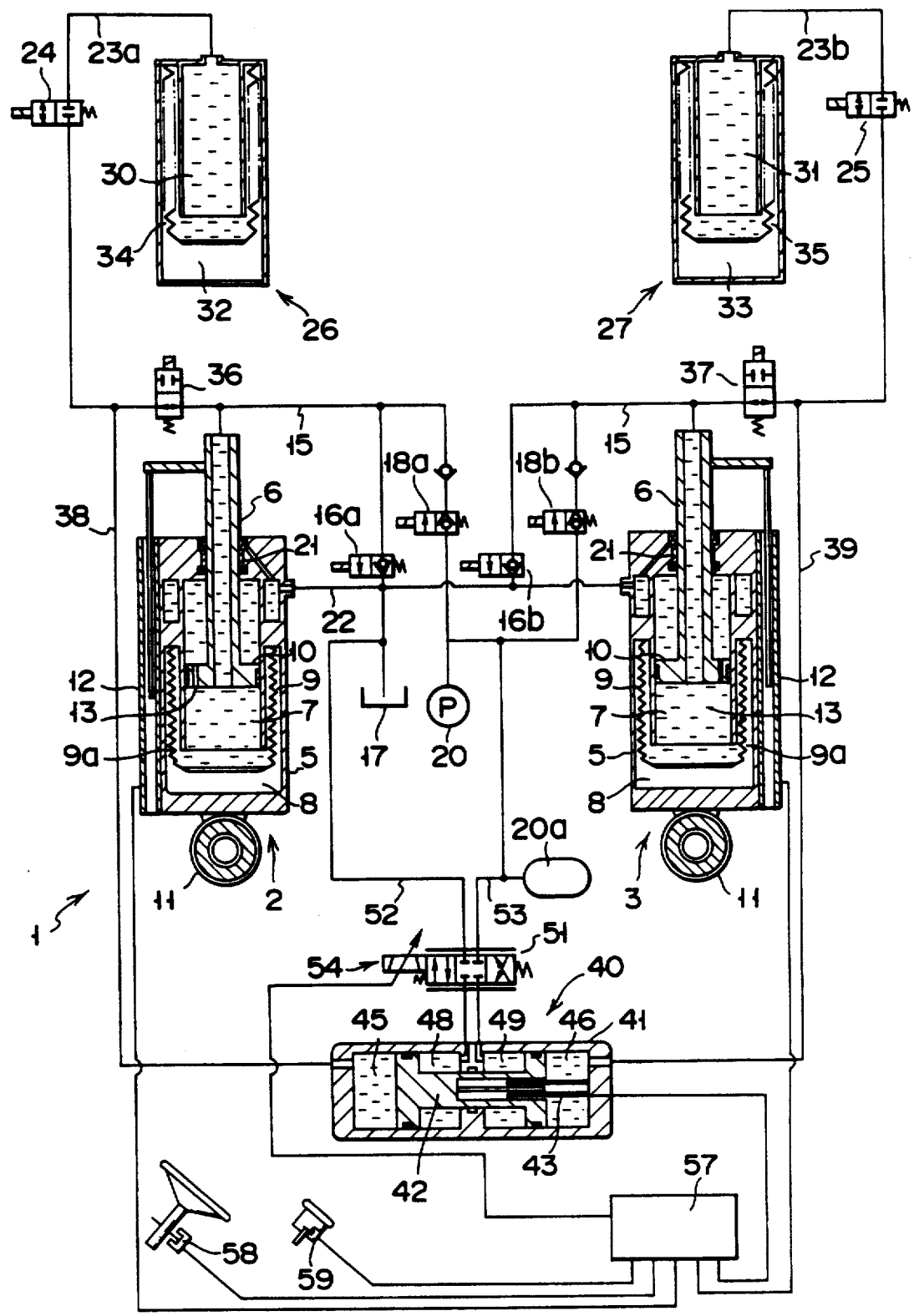
FIG. 4 shows a hydraulic system arrangement of an anti-roll system according to a second embodiment of the present invention.

FIG. 4 shows a second embodiment of the present invention. In this embodiment, oil chambers 7, 7 of suspension assemblies 2 and 3 are connected to anti-roll cylinder 40 through by-pass control valves 36 and 37, respectively.

Figure 9:
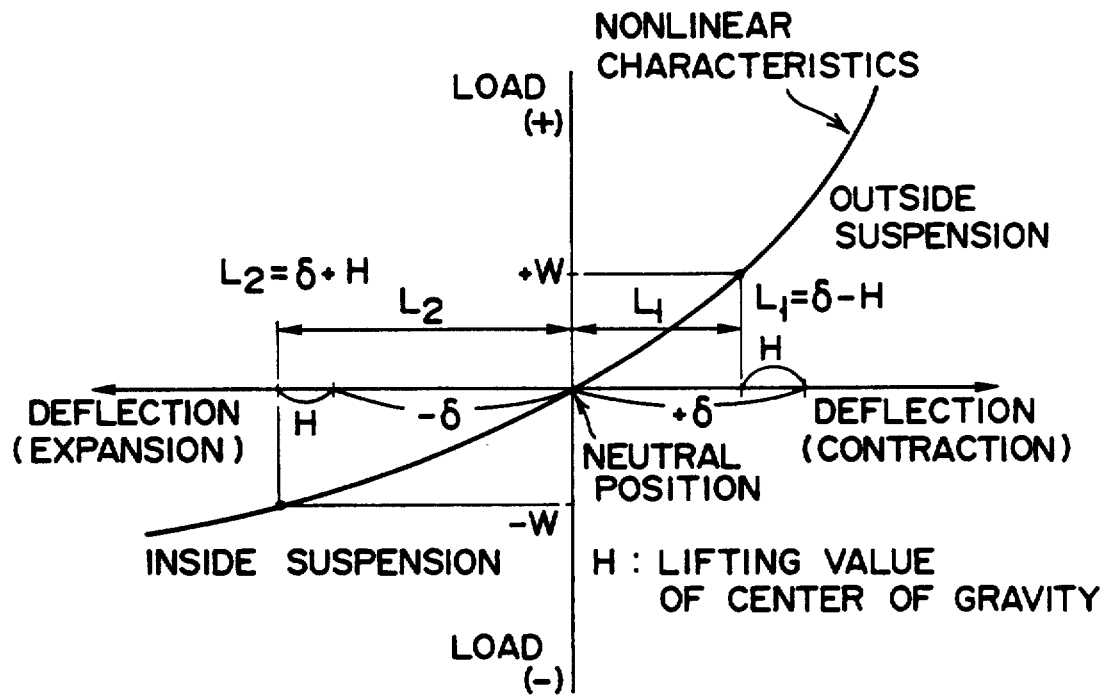
FIG. 9 is a diagram showing the relationship between the load and the deflection of hydropneumatic suspension assemblies.

The system of the second embodiment is operated as follows. When the vehicle turns to the left, for example, piston 42 of anti-roll cylinder 40 goes on moving to the right of FIG. 4 during the time interval between the start and the peak (near $G_{MAX}$ in FIG. 3) of the turning movement. As a result, some of the oil is discharged from inside suspension assembly 2. While the oil is supplied to outside suspension assembly 3. If the height of suspension assembly 3 exceeds a neutral position, outside by-pass control valve 37 is closed, while spring constant switching valve 25 is opened. By doing this, all the extra oil that is fed from anti-roll cylinder 40 to outside suspension assembly 3 after the neutral height is reached by suspension assembly 3 flows into sub-tank 27 of suspension assembly 3. Since inside by-pass control valve 36 is kept open, the oil continues to be discharged from inside suspension assembly 2 while the centrifugal force is increasing, and suspension assembly 2 is kept at a predetermined height. If the pressure receiving surface area is S, volume V of the oil introduced into sub-tank 27 is given by $V = S \times 2H$ (H is equivalent to the lift value of FIG. 9). Valve 25, like by-pass control valve 37, may be normally open. If valves 25 and 37 are normally open, the oil fed from anti-roll cylinder 40 to outside suspension assembly 3 after the start of the turning movement starts to flow also into sub-tank 27. In this case, therefore, only by-pass control valve 37 is closed when outside suspension assembly 3 is caused to exceed the neutral height by the oil fed from cylinder 40.

When the left-handed turning movement is past its peak so that the centrifugal force starts to be reduced, the oil in sub-tank 27 is returned to anti-roll cylinder 40 through oil passage 39 by the gas pressure inside sub-tank 27. As by-pass control valve 37 is opened, moreover, some of the oil is returned from outside suspension assembly 3 to control cylinder 40. Thus, left and right suspension assemblies 2 and 3 are balanced, and vehicle body can be prevented from floating, during the turning movement.

Valves 24 and 25 and by-pass control valves 36 and 37 may be simple switching valves. Alternatively, however, flow regulating valves may be used for the purpose so that the flow quantity per unit time can be adjusted.

Figure 5:
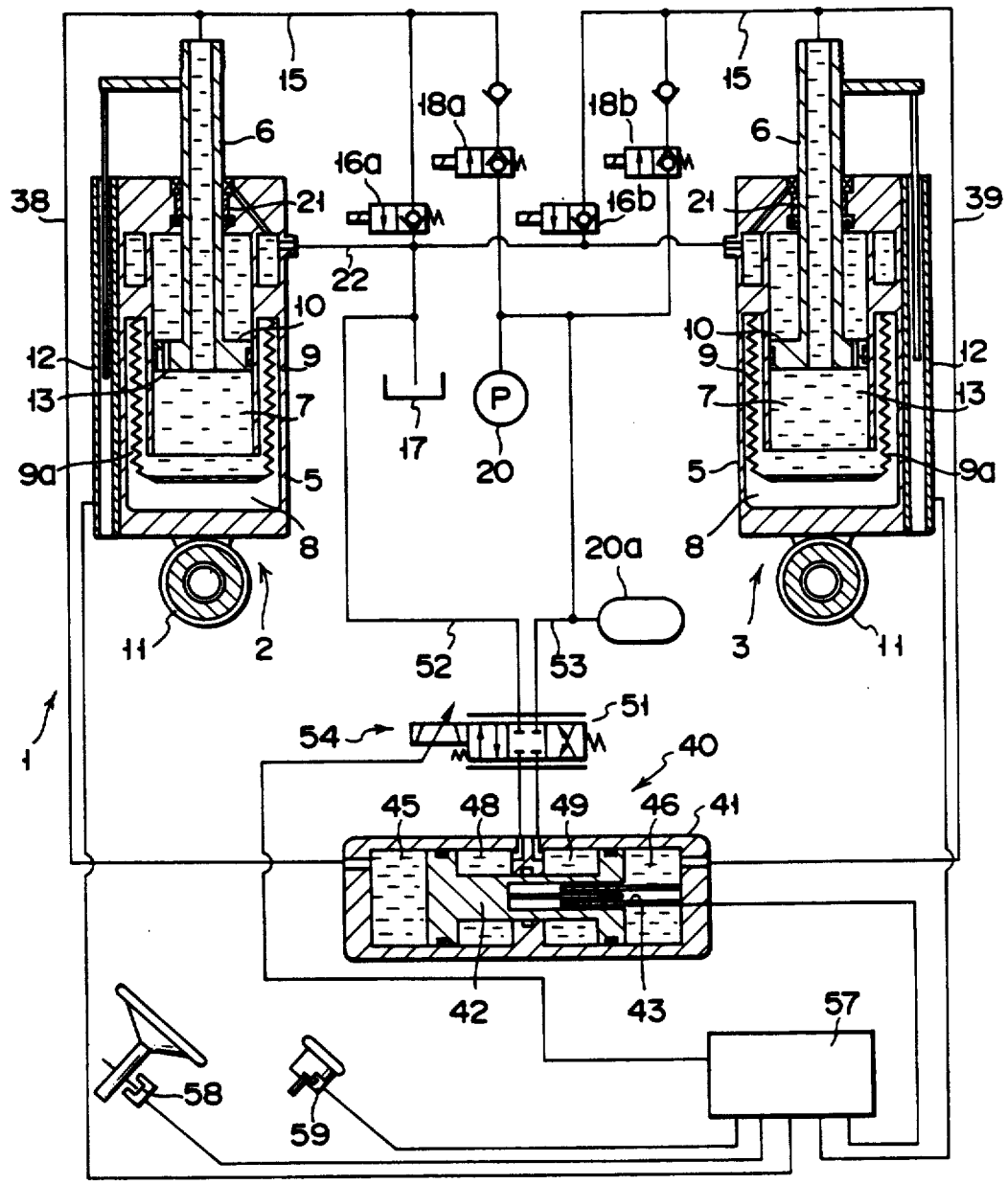
FIG. 5 shows a hydraulic system arrangement of an anti-roll system according to a third embodiment of the present invention.
Figure 8:
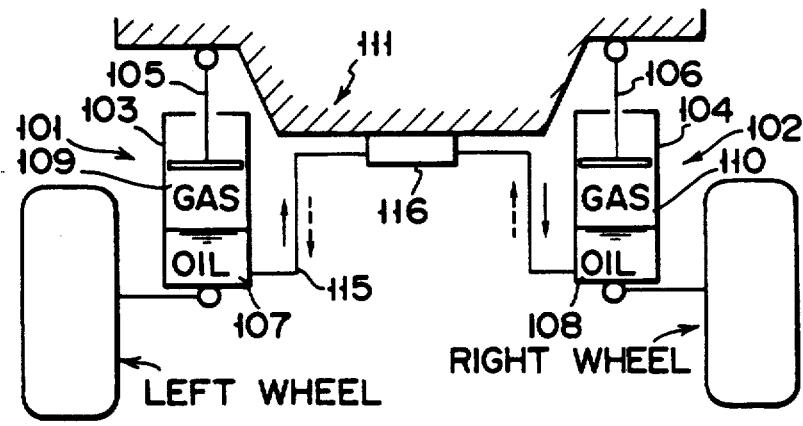
FIG. 8 shows an outline of a prior art anti-roll system.

FIG. 5 shows a third embodiment of the present invention. In this embodiment, the object of the invention is achieved by controlling oil discharging valves 16a and 16b and oil supplying valves 18a and 18b during the turning movement of the vehicle. The system of the third embodiment is operated as follows.

When the vehicle turns to the left, for example, piston 42 of anti-roll cylinder 40 moves toward right oil chamber 46, as in the case of the foregoing embodiments. Thereupon, the oil is supplied to outside suspension assembly 3 so that the heights of left and right suspension assemblies 2 and 3 are equal, and at the same time, the same amount of oil is discharged from inside suspension assembly 2. In the present embodiment, height $\underline{h}$ of inside suspension assembly 2 is compared with neutral height $\underline{N}$, as shown in FIG. 6, while the centrifugal force is increasing after the start of the turning movement. If exceeds N, oil discharging valve 16a is opened, so that the oil is discharged from inside suspension assembly 2. When the turning movement is past its peak so that the centrifugal force starts to be reduced, height $\underline{h}$ of inside suspension assembly 2 is compared with neutral height $\underline{N}$, as shown in FIG. 7. If $.uns/h/$ is smaller N, oil supplying valve 18a is opened, so that the oil is supplied to inside suspension assembly 2.

When the vehicle turns to the right, piston 42 of anti-roll cylinder 40 is driven in the opposite direction, in contrast with the case of the left-handed turning movement. Thereupon, the oils is fed into oil chamber 7 of left-wheel suspension assembly 2, while some of the oil in right-wheel suspension assembly 3 is discharged. Before the peak of the turning movement is reached, oil discharging valve 16b is controlled so that the height of inside suspension assembly 2 does not exceeds the neutral height, as shown in FIG. 6. When the turning movement is past its peak so that the centrifugal force starts to be reduced, oil supplying valve 18b is controlled so that the height of inside suspension assembly 2 never becomes lower than the neutral height, as shown in FIG. 7. Thus, the vehicle height can be kept constant, the center of gravity of the vehicle body can be prevented from rising.

What is claimed is:

1. An anti-roll system for stabilizing the orientation of the body of a vehicle while the vehicle is turning, comprising:

a pair of hydropneumatic suspension assemblies each including a cylinder and a rod inserted therein, each said suspension assembly having an oil chamber containing oil and a gas chamber charged with compressed gas and having a nonlinear spring characteristic such that the spring constant of the suspension assembly increases as the suspension assembly deflects in the direction moving the rod into the cylinder;

an anti-roll cylinder connected to the paired suspension assemblies and adapted to discharge some of the oil from the inside suspension assembly to supply oil to the outside suspension assembly so that the heights of the two suspension assemblies are equal as the vehicle turns;

accumulating means connected to each said suspension assembly and having a gas chamber defined therein, said gas chamber containing a compressed gas; and spring constant switching means disposed between the suspension assemblies and the accumulating means corresponding thereto, each of said switching means being adapted to operate such that the outside suspension is caused to communicate with the accumulating means, thereby causing the gas chamber of the outside suspension and the gas chamber of the accumulating means to cooperate with each other, as the vehicle turns.

2. The anti-roll system according to claim 1, wherein each of said suspension assembly is provided with first accumulating means, first spring constant switching means, second accumulating means, and second spring constant switching means, so that only the first spring constant switching means is operated so that the outside suspension assembly communicates with only the first accumulating means when the vehicle turns slightly, and that the first and second spring constant switching means are operated so that the outside suspension assembly communicates with both the first and second accumulating means when the vehicle turns sharply.

3. The anti-roll system according to claim 1, further comprising a sensor for detecting the angle of the steering wheel when the vehicle turns, a sensor for detecting the speed of the vehicle, and a controller supplied with detection signals delivered from the sensors and a reference value for the height of each said suspension assembly, said controller being adapted to calculate the size of the centrifugal force produced during the turning movement on the basis of the relationship between the steering angle and the vehicle speed detected by means of the sensors, and to actuate the anti-roll cylinder only when the calculated value exceeds the reference value.

4. The anti-roll system according to claim 1, further comprising a height sensor for detecting the height of each said suspension assembly, a controller supplied with a signal delivered from the height sensor, and a servo mechanism for driving the anti-roll cylinder in response to a signal delivered from the controller, said controller being adapted to operate the servo mechanism in a direction such that the heights of the suspension assemblies of both the left and right wheels are equal, in response to a height signal delivered from the sensor.

5. An anti-roll system for stabilizing the orientation of the body of a vehicle while the vehicle is turning, comprising:

a pair of hydropneumatic suspension assemblies each including a cylinder and a rod inserted therein, each said suspension assembly having an oil chamber containing oil and a gas chamber charged with compressed gas and having a nonlinear spring characteristic such that the spring constant of the suspension assembly increases as the suspension assembly deflects in the direction moving the rod into the cylinder;

an anti-roll cylinder connected to the paired suspension assemblies and adapted to discharge some of the oil from the inside suspension assembly to supply oil to the outside suspension assembly so that the heights of the two suspension assemblies are equal as the vehicle turns;

accumulating means connected to each said suspension assembly and having a gas chamber defined therein, said gas chamber containing a compressed gas;

oil passages connecting oil chambers of the paired suspension assemblies and the anti-roll cylinder; and bypass control means disposed midway along each said oil passage, and adapted to disconnect the oil chamber of the outside suspension assembly from the anti-roll cylinder, thereby causing the oil from the anti-roll cylinder to flow into the accumulating means, after the height of the outside suspension assembly is caused to attain a reference height by the oil from the anti-roll cylinder, while the centrifugal force produced during the turning movement of the vehicle is increasing, and to connect the oil chamber of the outside suspension assembly with the anti-roll cylinder, thereby causing the oil to flow from the outside suspension assembly into the anti-roll cylinder, while the centrifugal force is decreasing after the peak of the turning movement.

6. The anti-roll system according to claim 5, further comprising a sensor for detecting the angle of the steering wheel when the vehicle turns, a sensor for detecting the speed of the vehicle, and a controller supplied with detection signals delivered from the sensors and a reference value for the height of each said suspension assembly, said controller being adapted to calculate the size of the centrifugal force produced during the turning movement on the basis of the relationship between the steering angle and the vehicle speed detected by means of the sensors, and to actuate the anti-roll cylinder only when the calculated value exceeds the reference value.

7. The anti-roll system according to claim 5, further comprising a height sensor for detecting the height of each said suspension assembly, a controller supplied with a signal delivered from the height sensor, and a servo mechanism for driving the anti-roll cylinder in response to a signal delivered from the controller, said controller being adapted to operate the servo mechanism in a direction such that the heights of the suspensions assemblies of both the left and right wheels are equal, in response to a height signal delivered from the sensor.

8. The anti-roll system according to claim 5, wherein said bypass control means includes a flow regulating valve whose opening is adjustable.

9. An anti-roll system for stabilizing the orientation of the body of a vehicle while the vehicle is turning, comprising:

a pair of hydropneumatic suspension assemblies each including a cylinder and a rod inserted therein, each said suspension assembly having an oil chamber containing oil and a gas chamber charged with compressed gas and having a nonlinear spring characteristic such that the spring constant of the suspension assembly increases as the suspension assembly deflects in the direction moving the rod into the cylinder;

an anti-roll cylinder connected to the paired suspension assemblies and adapted to discharge some of the oil from the inside suspension assembly to supply oil to the outside suspension assembly so that the heights of the two suspension assemblies are equal as the vehicle turns;

oil discharging means connected to the suspension assemblies and adapted to continue discharging the oil from the inside suspension so that the height of the inside suspension assembly prior to the turning movement is maintained, while the centrifugal force produced during the turning movement of the vehicle is increasing; and oil supplying means connected to the suspension assemblies and adapted to continue supplying the oil to the inside suspension so that the height of the inside suspension assembly prior to the turning movement is maintained, while the centrifugal force is decreasing after the peak of the turning movement.

10. The anti-roll system according to claim 9, further comprising a sensor for detecting the angle of the steering wheel when the vehicle turns, a sensor for detecting the speed of the vehicle, and a controller supplied with detection signals delivered from the sensors and a reference value for the height of each said suspension assembly, said controller being adapted to calculate the size of the centrifugal force produced during the turning movement on the basis of the relationship between the steering angle and the vehicle speed detected by means of the sensors, and to actuate the anti-roll cylinder only when the calculated value exceeds the reference value.

11. The anti-roll system according to claim 9, further comprising a height sensor for detecting the height of each said suspension assembly, a controller supplied with a signal delivered from the height sensor, and a servo mechanism for driving the anti-roll cylinder in response to a signal delivered from the controller, said controller being adapted to operate the servo mechanism, the oil discharging means, and the oil supplying means in a direction such that the heights of the suspension assemblies of both the left and right wheels are equal, in response to a height signal delivered from the sensor.

* * * * *